United States Patent [19]

Mallatt et al.

[11] 4,168,228

[45] Sep. 18, 1979

[54] WASTE WATER PURIFICATION

[75] Inventors: Russell C. Mallatt, Crown Point, Ind.; Joe D. Walk, Homewood, Ill.; James F. Grutsch, Hammond, Ind.

[73] Assignee: Standard Oil Company of Indiana, Chicago, Ill.

[21] Appl. No.: 806,748

[22] Filed: Jun. 15, 1977

[51] Int. Cl.² .......................... C02C 1/06; C02C 5/10
[52] U.S. Cl. .......................... 210/7; 210/11; 210/17; 210/18; 210/40; 210/44
[58] Field of Search .......................... 210/4, 7, 15, 17, 18, 210/39, 40, 44, 60, 63 R, 73 S, 73 OW, 79, 82, 73 R, 11, 30 R

[56] References Cited

U.S. PATENT DOCUMENTS

| | | | |
|---|---|---|---|
| 2,059,286 | 11/1936 | Statham | 210/18 |
| 2,368,055 | 1/1945 | Walker | 210/7 |
| 3,218,253 | 11/1965 | Clarke | 210/40 |
| 3,377,271 | 4/1968 | Cann | 210/7 |
| 3,551,203 | 12/1970 | Corson et al. | 210/39 |
| 3,617,539 | 11/1971 | Grutsch et al. | 210/82 |
| 3,730,881 | 5/1973 | Armstrong | 210/15 |
| 3,763,040 | 10/1973 | Timpe et al. | 210/40 |
| 3,764,524 | 10/1973 | Stankewich | 210/18 |
| 3,803,029 | 4/1974 | Blecharczyk | 210/17 |
| 3,904,518 | 9/1975 | Hutton | 210/40 |
| 3,957,632 | 5/1976 | Knopp et al. | 210/18 |
| 4,005,011 | 1/1977 | Sweeny | 210/18 |
| 4,053,396 | 10/1977 | Trense | 210/40 |
| 4,073,722 | 2/1978 | Grutsch et al. | 210/5 |

Primary Examiner—Charles N. Hart
Assistant Examiner—Ernest G. Therkorn
Attorney, Agent, or Firm—Frank J. Sroka; Arthur G. Gilkes; William T. McClain

[57] ABSTRACT

Disclosed is an improved process for the treatment and purification of waste water. Generally the process comprises the use of primary, intermediate, and secondary treatment but tertiary treatment may also be included. Powdered activated carbon is used in the secondary treatment with recycle to any or all of the primary, intermediate or secondary treatment stages. Regeneration of used powdered activated carbon is also provided. In some cases, the improved process for the purification of waste water comprises feeding the waste water to a first clarification zone wherein easily removable solids are separated from the water; passing the effluent from the first clarification zone to a filtration or air flotation zone wherein suspended solids and colloidal matter are separated from the water; passing the effluent from the filtration or air flotation zone to an aeration zone wherein the water is contacted with activated sludge and powdered activated carbon, and oxygen is introduced into the water-sludge-carbon mixture; passing the effluent from the aeration zone to a second clarification zone wherein purified water is separated from the sludge and carbon; recycling a first portion of the separated sludge and carbon from the second clarification zone to the filtration zone effluent; recycling a second part of the separated sludge and carbon from the second clarification zone to the first clarification zone effluent; and passing purified water from the second clarification zone.

22 Claims, 1 Drawing Figure

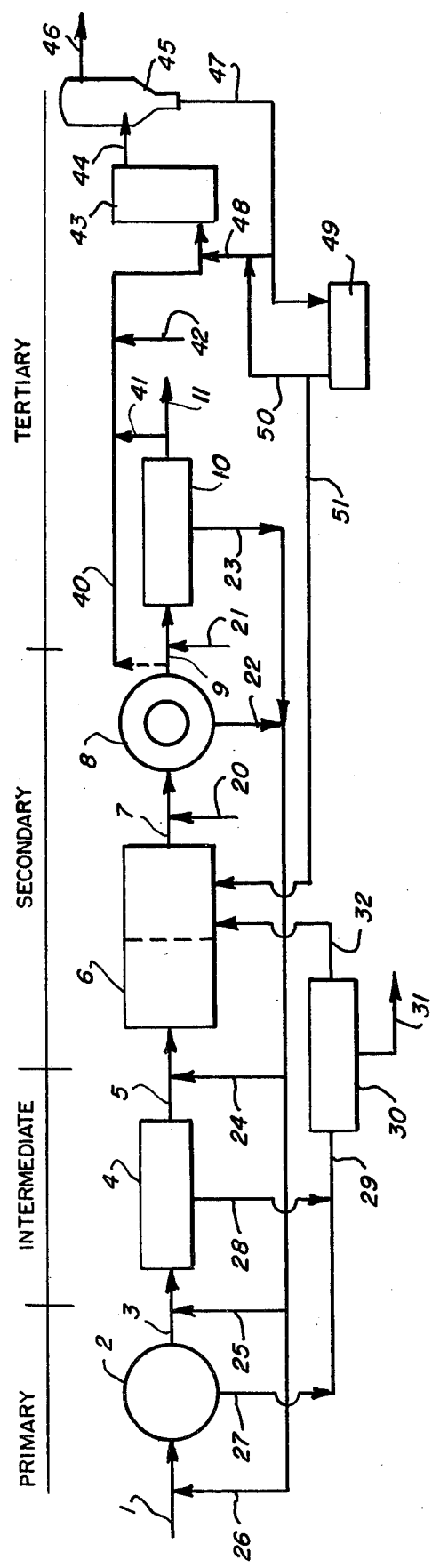

WASTE WATER PURIFICATION

BACKGROUND

The treatment of contaminated waste water from municipal or industrial sources involves a sequence of processing steps for maximizing water purification at minimum costs. Industrial effluents, particularly waste water from oil refineries, include a broad spectrum of contaminants and consequently such waste water is usually more difficult to decontaminate than waste water from municipal sewage systems. Four main sequential process treatments are used to decontaminate such industrial effluents although similar treatment is given municipal effluents, or combined municipal/industrial effluents. These are a primary, intermediate, secondary, and tertiary treatments. The primary treatment calls for removal of gross amounts of oil and grease and solids from the waste water. In the oil industry, usually separators of American Petroleum Institute design are employed for removal of free, separable oil and solids. In municipal waste water treatment, generally little free oil is present but solids removal is still needed. The intermediate treatment is the next process and it is designed to adjust water conditions so that the water entering the secondary treatment zone will not impair the operation of the secondary treatment processes. In other words, intermediate treatment is designed to optimize water conditions so that the secondary treatment process will operate most efficiently. The secondary treatment calls for biologically degrading dissolved organics and ammonia in the water. One of the most common biological treatment processes employed is the activated sludge process discussed below in greater detail. The tertiary treatment calls for removing residual biological solids present in the effluent from the secondary treatment zone and removing contaminants which contribute to impairing water clarity or adversely affecting water taste or odor. This is usually a filtration of the water, preferably through beds of sand, or combinations of sand and coal, followed by treatment with activated carbon.

The activated sludge process is a conventional waste water treating process which produces the highest degree of biological treatment in reasonably compact facilities at the present time. The application of this process to the treatment of industrial waste water has, however, been slow compared with municipal applications. Industrial applications of this process are nevertheless increasing rapidly. Currently, the activated sludge process is capable of achieving substantial reduction in the five-day biological oxygen demand ($BOD_5$). However, the $BOD_5$ contaminants present in industrial waste water are relatively small compared with the total oxygen demanding contaminants present in such waste water as measured by the chemical oxygen demand (COD) test. For example, $BOD_5$ contaminants present in the effluent from an activated sludge process typically ranges from 10 to 20 parts per million parts of water. It is not uncommon to also find present in such effluent 10 to 20 times this amount of COD.

The activated sludge process generally has two, three or four stages of treatment. In the first stage, contaminated water is contacted with the activated sludge. The sludge includes micro-organisms which feed on the contaminants in the water and metabolize these contaminants to form cellular structure and intermediate products. This decontaminated water flows into a second clarifier stage where suspended sludge particles are separated from the decontaminated water. A portion of the sludge is recycled to the first stage and the remainder can be forwarded to the third and fourth stages. This sludge forwarded to the third and fourth stages includes water. In the third stage the sludge is thickened to remove excess water and in the fourth stage the thickened sludge is permitted to digest, that is, the micro-organisms feed upon their own cellular structure and are stabilized.

Recently, the importance of powdered activated carbon in waste water treatment is being realized. However, the use of powdered activated carbon has been uneconomical because of under utilization of a given amount of carbon. Also, carbon has not been added to the treating sequence at points where it can do the most good. Still further, the use of carbon and the waste water treatment scheme have not been well integrated so as to achieve the best effluent quality.

It is an object of this invention to provide a waste water process which produces high quality effluent.

It is an object of this invention to provide a waste water process which makes efficient use of powdered carbon.

It is an object of this invention to provide an integrated waste water treatment process which reduces the amount of coagulant/flocculents needed, produces a sludge of reduced water content, makes efficient use of powdered activated carbon, and produces a high quality effluent.

SUMMARY OF THE INVENTION

Disclosed is an improved process for the treatment and purification of waste water. Generally the process comprises the use of powdered activated carbon in a waste water treatment scheme comprising primary, intermediate, and secondary treatment. Tertiary treatment may also be used. Carbon which is separated from secondary treatment can be recycled to any or all of the primary, intermediate or secondary treatment stages. Spent or partially deactivated carbon can be regenerated or reactivated.

Generally the improved process for the purification of waste water comprises feeding the waste water to a first clarification zone wherein easily removable solids are separated from the water; passing the effluent from the first clarification zone to a filtration or air flotation zone wherein suspended solids and colloidal matter are separated from the water; passing the effluent from the filtration or air flotation zone to an aeration zone wherein the water is contacted with activated sludge and powdered activated carbon, and oxygen or air is introduced into the water-sludge-carbon mixture; passing the effluent from the aeration zone to a second clarification zone wherein purified water is separated from the sludge and carbon; recycling a first portion of the separated sludge and carbon from the second clarification zone to the filtration zone effluent; recycling a second part of the separated sludge and carbon from the second clarification zone to the first clarification zone effluent; and passing purified water from the second clarification zone.

Commonly about 0.1 to about 5 weight percent of the total weight of sludge and carbon from the second clarification zone is recycled to the first clarification zone effluent and about 95 to about 99.9 weight percent of the total weight of sludge and carbon from the second clarification zone is recycled to the filtration zone effluent. Sludge and carbon recycled to the filtration or air flotation zone effluent naturally can be recycled to the aeration zone.

A third portion of the separated sludge and carbon from the second clarification zone may be recycled to the feed waste water to the first clarification zone. Preferably about 0.01 to about 10 weight percent of the total weight of separated sludge and carbon from the second clarification zone is recycled to the first clarification zone effluent, about 90 to about 99.9 weight percent of the total weight of separated sludge and carbon from the second clarification zone is recycled to the filtration or air flotation zone effluent, and about 0.01 to about 10 weight percent of the total weight of separated sludge and carbon from the second clarification zone is recycled to the feed waste water to the first clarification zone.

Generally the first clarification zone is referred to as primary treatment. Gross amounts of oil, grease and solids are removed from the oil refinery and/or chemical waste water by means of American Petroleum Institute separators. In treating municipal waste water, generally little oil is present but solids removal is carried out using clarifiers of conventional design. The effluent from this primary treatment typically includes from about 25 to about 150 parts of suspended solids per million parts of water and from about 25 to about 300 parts of oil and grease per million parts of water. In treating municipal waste, the oil level may be even lower. As is not commonly recognized, such waste water containing relatively large amounts of oil and/or solids, cannot be fed directly into an activated sludge process where the sludge age is in excess of about ten days without upsetting the activated sludge process. Excessive amounts of oil and hydrocarbon can result in gross quantities of oily, emulsified material collecting in the aeration zone or liquor tank of the activated sludge process. Such oily, emulsified solids impair or prevent the activated sludge from decontaminating the water, causing the effectiveness of the activated sludge process to be substantially diminished.

Waste water is then subjected to intermediate treatment where excessive solids and/or hydrocarbons are removed and, preferably, contaminant concentrations are equalized so that such concentrations of contaminants remain more or less constant even though the contaminant concentration in the influent to the equalization treatment stage sharply changes from time to time. If waste water from a petroleum-chemical complex is being treated, it is desirable that the waste streams be combined and then subjected to intermediate treatment. If contaminant concentration in the influent changes and such change is sustained, this will ultimately result in a change in the contaminant concentration in the effluent from the equalization section. But in a staged equalization zone, this change initially will occur gradually over a relatively long time interval. This permits the micro-organisms in the downstream activated sludge process to adapt or acclimate to this change in contaminant concentration while maintaining process purification efficiency.

Intermediate treatment commonly includes filtration or air flotation and, where needed, equalization. Equalization is preferably conducted in a basin having two, more preferably three or four compartments. These compartments are mixed and arranged in series so that water flows from one compartment to the next succeeding compartment. The total retention time of water in the basin is less than about 10 to 15 hours preferably 2 to 15 hours maximum. Consequently, heat loss is minimized. Normally, the difference in temperature between the influent and effluent water is 20° F. or less. Preferably the retention time in each compartment is 30 to 90 minutes.

Waste waters from the various sources are mixed in the first compartment, and the contaminant concentration is monitored. Usually pH, toxic metals, COD contaminants, phenolic, and ammonia concentrations are measured either manually or automatically. Since waste waters from multiple sources are fed into the relatively confined space in the first compartment, several advantages occur. First it is easy to monitor contaminant concentration and readily detect any drastic change in concentration indicating, for example, a break in a chemical line. The reason is because the first compartment in a multiple compartment system will more rapidly increase in concentration to more readily detectable levels than a single compartment system. Also neutralization is achieved. For example, one source of water may be highly acidic and another highly basic. Neutralization occurs as these streams mix in the first compartment. Waste streams from municipal sources generally do not vary greatly in acid/basic content.

The pH is adjusted in the equalization basin in order to maximize oxidation of certain contaminants, particularly sulfides. pH is adjusted by adding acid or base to the water in the second compartment until the water has a pH ranging from about 6.5 to about 9.5, preferably between 7.5 and 8.5. In some cases dissolved oxygen must be present to satisfy the immediate oxygen demand (IOD) of the contaminants in the water at a reasonable rate of oxidation. In these cases it may be preferable to add hydroquinone or gallic acid to the water to catalyze the oxidation of IOD contaminants. If this IOD is not satisfied, the downstream activated sludge process can be adversely affected. Consequently, the water in the equalization basin is commonly aerated. Conventional floating aerators may be used. Aeration is generally more effective in a confined zone. About 0.15 or more horsepower per thousand gallons of water provides excellent aeration. Aeration also thoroughly agitates and mixes the water with the result colloidal and suspended oils and solids are mechanically flocculated and accumulate on the water surface. These oily solids are removed by skimming. In order to ensure that the water to the activated sludge process contains low concentrations of hydrocarbon, such as oil and grease, and solids a coagulating and/or flocculating agent can be added to the water in the equalization basin or to the stream of water flowing to the activated sludge process. The coagulating and/or flocculating agent destabilizes colloidal particles which then aggregate. The aggregates are carried with the effluent stream to a first filtration zone, such as a granular bed mixed media filter, and removed prior to introduction of the stream to the activated sludge process. Air is sometimes introduced into the stream of water flowing to the downstream activated sludge process to ensure that the immediate oxygen demand to the water is satisfied. Dissolved air flotation can also be used to remove the destabilized colloidal particles. Commonly, filtration is most convenient.

Filters generally consist of a bed of granular nonporous material held in place by the force of gravity. The most widely used units are rapid-sand or combinations of sand and coal filters in which gravity holds the material in place, and in which the flow is vertically downward. The filter medium is usually supported on a gravel bed which is underlain by an underdrain system that collects the water into a pipe which conveys it to a filtered water chamber. In one common type of granular media filter system, screened gravel is installed in a series of layers several inches thick ranging from coarser stones at the bottom to 0.1-inch or smaller particles at the top.

The normal operation of granular filters involves downward flow through the media until pressure drop due to clogging, or breakthrough of suspended matter, increases to a predetermined limit. The filter is then cleaned by reversed flow fluidization after pretreatment by air scrubbing or a hydraulic surface wash. Commonly used filter media are sand, such as rough or rounded silica sand, silica gravel, garnet sand, crushed or alluvial anthracite, and polymeric materials such as particles of polystyrene, polyethylene and the like. Often, several materials are used in layers in a single filter, sometimes called a mixed media filter. In some cases, fibrous materials can be used.

Filter beds utilize the coarse material comprising the bottom gravel layer to absorb the energy of the high velocity jets emerging from the underdrain system during a backwash operation. Once the backwashing streams emerge through the gravel layer their flow is slowed down enough to allow them to spread uniformly under the entire sandbed but still retain enough velocity to fluidize the finer granular filter media. This is important since these types of filters are periodically cleaned with filter water by reversal of flow and discharge of the sediment-laden water to a drain. Most rapid-sand filters are contained in concrete boxes and designed so that the upward flow of washwater, with auxiliary scouring systems, lifts the removed sediment out of the expanded filter medium and flushes it away to a point of disposal.

Granular media filters are frequently referred to as gravity or pressure filters. Since granular media filters are only a small part of the spectrum in filtration art, the meaning associated with these descriptions may be at variance with other filter technology. In the simplest terms, a gravity filter is a downflow design in which the water standing above the filter media is under atmospheric pressure. A gravity unit may be operated as a constant or declining rate unit; i.e., as the filter media clogs and the pressure drop increases, the rate may be maintained by increasing the head of water above the media, or allowed to decrease by maintaining a constant head. The pressure drops across a freshly regenerated unit is about 1 foot of water and the pressure drop at the end of the filter cycle may be as little as 5 feet or as much as 10-12 feet of water. A pressure filter of the granular media type is simply the same system in an enclosed vessel; i.e., the operating pressure drops across the media are about the same. In contrast, pressure filters in filtration systems other than the granular media type may have pressure drops orders of magnitude higher. Within the framework of these descriptions it is obvious that a variety of engineering and hydraulic designs are possible.

As time on-stream progresses, these granular media filters lose effectiveness. The filter media becomes contaminated with various organic and inorganic substances to the point where it will no longer operate properly. Often, simple backwashing of the filter is sufficient to at least partially restore filter efficiency. Backwashing is conducted by reversing the flow of liquid through the filter bed.

Water from intermediate treatment flows through an activated sludge plant having an aeration zone and a second clarification zone. Preferably, the water mixture flowing between the aeration zone and second clarification zone of the activated sludge process is aerated. Oxygen either pure or more preferably in air or enriched air is introduced, for example pressurized or most preferably by aspiration, into the stream of sludge and water flowing between the aeration zone and the clarification zone. This stream of sludge, water and air or oxygen is subjected to the increased pressure created by the hydrostatic heads of water in the mixed liquor and clarifier tanks. Consequently, this stream may be saturated or supersaturated with dissolved oxygen. The dissolved oxygen may maintain the sludge in the clarifier tank aerobic and ensures that the effluent water to subsequent treatment contains dissolved oxygen. Oxygen, either in air or pure form, may be injected under pressure into the sludge and water effluent from the second clarification zone.

The effluent from the second clarification zone is filtered to remove biological solids in the effluent and then may be contacted with activated carbon to remove odor causing and other residual trace components by adsorption. Chemical agents may be added to the second clarification zone effluent to destablize colloidal suspensions and assist filtration.

When activated carbon is used in secondary treatment, it is commonly added to the aeration zone, separated in a clarification zone, and at least a portion of it recycled to the aeration zone. This provides a mechanism for increasing the utilization of the carbon and operating at higher sludge ages. Under the present invention, it is preferable to add the activated carbon to the effluent from the aeration zone. With this mode of addition, the carbon is contacted with water having a relatively low concentration of soluble contaminants and not exposed to premature spending by contact with larger concentrations of soluble organics in the aeration zone because of mixing and distribution problems. Contact time between the carbon and contaminants in the water can be increased by various configurations of piping or clarification zones. The carbon is commonly added here continuously.

It is still more preferable to add activated carbon to the second clarification zone effluent. With this point of addition, fresh carbon is contacted with water having very little solids which would unnecessarily burden the carbon. Also, fresh carbon with maximum activity is available to purify the water after biological treatment, a point in the process where many consider it difficult to purify the water further. The carbon can be added at this point either continuously or discontinuously. Preferably, a discontinuous slug addition of carbon can be made and captured by a downstream mixed media granular filter. Water passing through the filter would contact high concentrations of powdered activated carbon. From time to time, the carbon can be backwashed to be recycled to the first clarification zone feed, first clarification zone effluent, filtration or dissolved air flotation zone effluent, aeration zone, or to carbon regeneration.

Sludge and activated carbon from the second clarification zone can be recycled to the filtration zone effluent to provide for sludge recycle to the aeration zone in secondary treatment. This recycle provides a method of cycling up to high sludge age when desirable in secondary treatment. Where there is no regeneration of activated carbon, it is generally desirable to operate the biological system at high sludge age, generally at greater than 10, preferably greater than 30, days average sludge age. In many cases benefits can be derived from operating at average sludge ages of 100 days or higher. Where spent or partially deactivated powdered carbon is regenerated or reactivated, the secondary process is commonly operated at lower sludge ages, often less than about 30 days average sludge age.

Primary and intermediate treatment prepare wastes or waste water for biological treatment. It is highly desirable to reduce the amount of non-soluble total organic content (TOC) which puts unnecessary burden on the biological system. This non-soluble TOC, commonly colloidal in nature, is preferably substantially reduced so that the biological system can operate at greater efficiency. The amount of reduction of these colloidal materials such as solids and hydrocarbons vary with the type of wastes being treated. However, it is generally preferred to remove as much non-soluble TOC as is economically feasible. In, for example, oil refining on petroleum wastes, TOC can generally be reduced to less than about 20 ppm oil and 20 ppm solids. It is preferable to reduce these contaminants to even lower levels, such as less than 10 ppm each. In municipal applications, it may not be necessary to reduce non-soluble TOC to these low levels because solids in municipal primary effluents are commonly more biodegradable than refinery or chemical plant effluents.

Recycle of sludge and activated carbon from the second clarification zone also provides a method for cycling up the concentration of activated powdered carbon in the secondary treatment zone, thereby achieving much higher concentrations of carbon than the carbon addition rate per gallon or per pound of waste water. This high concentration of powdered activated carbon is highly beneficial to improved water purification. Recycling sludge and carbon to the aeration zone also provides for the fuller utilization of the carbon by providing for longer contact time with contaminants.

A second portion of the separated sludge and carbon from the second clarification zone is recycled to the first clarification zone effluent. This carbon is then commonly entrained within the filtration zone where it continues to contact water and contaminants passing through the filtration zone. The filtration results in a reduction in soluble contaminants which greatly improves the effectiveness of the aeration zone and secondary treatment. This recycle features also provides biopolymer which aids in separation of solids in the first filtration zone, and often reduces the amount of coagulant needed. Where dissolved air flotation is used to treat first clarification zone effluent, benefits are also attained from the recycle of separated sludge and carbon.

A third portion of the separated sludge and carbon from the second clarification zone can be recycled to the feed to the first clarification zone where flocculation is enhanced and clarification zone efficiency improved. In this manner, the possible need for additional coagulants is reduced.

It is preferred that activated sludge and powdered activated carbon recycle to the first clarification zone, feed and effluent, and the filtration zone effluent, be conducted prior to carbon regeneration. In this manner, the powdered activated carbon is more fully spent before regeneration. Also, the associated biomass flocculates and aids in the removal of colloids and suspended matter in the filtration zone, the first clarification zone and the aeration zone, reducing the amount of chemical flocculents and coagulants needed. The powdered activated carbon is exposed to the highest concentrations of soluble TOC and COD for spending and removal. Another advantage is the sludge formed in the first clarification zone, filtration zone, and aeration zone separates more easily and has a higher BTU content because of reduced water content. This processing scheme emphasizes production of primary sludges which are much easier to dewater and handle, thereby minimizing costs for solids waste handling and disposal.

In most cases, about 1 to about 500 parts of fresh powdered activated carbon per part of feed waste water is added to the water. However, it is generally preferable to use lower concentration of carbon such as about 5 to about 40 parts of fresh powdered activated carbon per part of feed waste water. Most preferably, less than about 30 parts of fresh powdered activated carbon per part of feed waste water is added. It should be noted that because of sludge and activated carbon recycle from the second clarification zone, the concentration of activated carbon in the aeration zone can be substantially higher than the addition rate of fresh powdered activated carbon.

The preferred activated carbon has a BET surface area greater than about 1500, more preferably greater than about 2000, and still more preferably greater than about 2500 square meters per gram. Commonly such activated carbon is in powdered form and has a particle size such that at least 50 percent of it will pass through at 200 mesh per inch sieve, although generally about 70 to about 99 percent will pass through such a sieve.

Some powdered activated carbons have a high, negative electrical surface charge, for example a zeta potential of $-20$ to $-30$ millivolts. Coulombic repulsive forces keep more and more of the carbon particles in suspension as the size of the carbon particles get smaller. The negative electrical surface charge on filter's granular media also repulses the negatively charged carbon fines resulting in poor filtration efficiency such as the loss of carbon to the effluent. Reducing the electrical charge on carbon particles is important to improving the handling and application of powdered activated carbon.

In view of the above, and the desire to effect essentially total capture of substantially all carbon after the second stage, control of the zeta potential of carbon and control of the electrical charge on the filter media is important. Since the electrical charge of these surfaces is generally negative, control of surface charge can be effected by treating with surface active agents. Cationic type organic surfactants and/or polyelectrolytes can be used to adsorb on the surface of the particle and modify the charge. Examples of such well known surface active chemicals are fatty diamines, polyalkylene polyamines, dimethyl dialkyl ammonium chloride polymers (DMDAAC), copolymers of DMDAAC and acrylamide, quaternized fatty amines, polyacrylamides, and the like.

Another method of controlling the electrical surface charge on activated carbon is through the incorporation of certain metals into the carbon. Suitable metals are, for example, iron, magnesium, aluminum, tin, zirconium, and thorium. Magnesium is well suited for this purpose because of its effectiveness, low cost and high availability. The amount of metal needed to reduce the zeta potential will depend on the metal and method of incorporation, the type of carbon and method of preparation, and the desired level of reduction in zeta potential.

Common periods for incorporation of metals are during the carbonization or activation steps during the manufacture of activated carbon, or after the activation step such as to the final product. This latter means of metal incorporation can be achieved by simply soaking the activated carbon in a solution of the metal salt. Generally the metal is used in an inexpensive form. When incorporated during carbonization or activation steps, metal oxides, carbonates, inorganic salts, and organometallic salts such as soaps are suitable. When the metal is incorporated by adsorption onto activated carbon, the metal should be applied in a soluble form, then possibly insolubilized by hydrous oxide formation. It is preferred that the carbon has a zeta potential more positive than about $-10$ millivolts, more preferably about $-5$ to about $+5$ millivolts.

Activated carbon is commercially available. High activity, high surface area activated carbon will be available under the Amoco trademark. Suitable processes for making activated carbons can be found in U.S. Pat. Nos. 3,709,930; 3,726,808; 3,624,004; 3,642,657; 3,817,874; and 3,833,514, which are hereby incorporated by reference and made a part hereof.

After powdered activated carbon is contacted with contaminants or impurities, its ability to adsorb and purify becomes diminished. In order to make efficient use of the powdered activated carbon, it is often desirable to regenerate or reactivate the carbon for reuse.

In some cases, such as municipal plants, sand, dirt, grit, and the like are present which impair the regeneration of powdered activated carbon. In these instances, the carbon may not be suitable for regeneration. However, the process can be modified by minimizing or eliminating sludge/carbon recycle to the first clarification zone feed and maximizing sludge/carbon recycle to the first clarification zone effluent consistent with reasonable filtration zone operation.

Where carbon regeneration is feasible, a portion or all of the spent or partially deactivated powdered carbon from the first clarification zone and that backwashed from the filtration zone may be sent to a regeneration zone where powdered activated carbon is at least partially regenerated or reactivated. The reactivated or regenerated carbon can be passed to the aeration zone for further adsorption and bio-enhancement. The carbon is at least partially regenerated to partially restore its adsorption properties. Generally adsorbed organics are thermally removed and the carbon surface is reactivated. Depending on economic factors, it is desirable to reactivate the carbon to different levels. While it is generally preferred to regenerate the carbon to at least about 70 percent of its original BET surface activity, it may be sometimes desirable to regenerate to somewhat lower levels.

The activated carbon can be reactivated or regenerated by any number of methods. For example, the carbon can be incinerated in order to oxidize organic materials off the carbon. Oxidation gas conditions must be carefully controlled so that the carbon is not burnt up. One common method of incineration is a fluid bed process which circulates a hot heat conducting material such as sand, to which the sludge/carbon mixture is injected. Fluid bed incinerators commonly operate in the range of from about 1200° F. to about 1500° F. Another common method of incineration is a multiple hearth carbon regeneration process. This process passes the carbon/sludge mixture to a furnace having a carefully controlled atmosphere. Different zones of the furnace have different temperatures for drying, oxidation of organics, and regeneration of the carbon. The operating temperatures range from about 1200° F. to about 1900° F.

One preferred method of carbon regeneration is the wet air oxidation process. In this process, the carbon to be regenerated is thickened and passed as a slurry to a zone where it is contacted with air under very high pressure at elevated temperatures. Commonly the regeneration takes place at about 390° F. to about 470° F. whereat regeneration and selective oxidation takes place. The regeneration is conducted without dewatering the carbon slurry. The regenerated carbon slurry and regenerator gases are commonly cooled and returned to the waste water process.

The purified water from the second clarification zone often contains some finely divided carbon particles and other suspended solids. It is preferable to subject this water to filtration, a second filtration zone, to remove suspended solids. In some cases, it may be desirable to contact the purified water from this process with powdered activated carbon to produce an effluent of extremely high purity. This can be done by passing the purified or partially purified water from the second clarification zone or from the second filtration zone to a reactor where the water is contacted with high concentrations of powdered activated carbon. About 1 to about 100 parts powdered activated carbon per million parts of feed water are added to the feed to the reactor or to the reactor and the water allowed to contact the carbon for a time sufficient to reduce impurities to the desired level. The powdered activated carbon is separated from the purified water and a portion of the separated carbon is recycled to the feed to the reactor or to the reactor. A portion of the separated carbon can be regenerated or reactivated for reuse. The separation of the powdered activated carbon can be achieved by a cyclone separation. In a cyclone separator, water and solids are separated by centrifugal action. The discrete particles of active carbon are separated from the treated water in a solid-liquid cyclone separator. The flow containing the carbon particles enters the cylindrical inlet chamber of the cyclone near the periphery in a tangential pattern under controlled velocities. The resultant cyclonic flow pattern develops a centrifugal force that retains the carbon particles along the outer wall of the cyclone vessel. The controlled centrifugal flow pattern creates an outer spiraling flow pattern of the carbon particles along and down the outer wall of the cyclone leading to the apex opening where the carbon particles are discharged from the cyclone. As the spiraling flow pattern of the carbon particles is formed along the cyclone wall, an inner spiraling pattern of clarified water is formed. The spiraling clarified water enters into an exit pipe extending down into the vortex region of the cyclone and is thereby discharged from the cyclone.

One especially preferred method of removing carbon from water is wherein the cyclone separator is contained within a reactor vessel which also contains the reaction zone. In this matter, construction costs are minimized. The reactor vessel, which provides for the bulk of carbon contact time and concentration, may enclose the cyclone. This provides for a compact arrangement and simplifies the cyclone construction since it no longer has to withstand the high pressure of the system. Further, multiple inlet parts to the cyclone providing tangential cyclone flow patterns are more easily and economically provided for. The carbon captured by the cyclone may be recycled back to the reactor, externally to an eductor type mixer-contactor, or externally to regeneration or wastage.

THE DRAWING

The FIGURE is a schematic representation of a waste water treating process employing the concepts of this invention.

Waste water to be treated is passed through line 1 to first clarification zone 2. In clarification zone 2, commonly referred to as primary treatment, a crude separation of easily separable components is carried out. By allowing sufficient settling time, materials are allowed to either float on top of the water where they can be skimmed off, or allowed to settle down to the bottom of the tank of the zone by gravity where they can be removed. Partially purified water from first clarification zone 2 is passed through line 3 to filtration or air flotation zone 4. Filtration (or air flotation) zone 4 is commonly that portion of a waste water treatment process called intermediate treatment. In many cases, the water is subjected to equalization and chemical treatment, especially treatment with coagulants, prior to filtration in filtration zone 4. This intermediate treatment prepares the water for downstream treatment in a biological zone. By reducing oil and solids, especially colloidal matter, the downstream biological system can work much more efficiently. It is generally desirable for the effluent leaving the intermediate zone to contain as little contaminants as possible. Often it is desirable to reduce oil and grease, and solids, to less than about 20 parts per million each, preferably to less than 10 parts per million each. Filtered water leaves filtration zone 4 through line 5 where it passed through biological treatment, commonly called secondary treatment. Filtered water passes from line 5 to aeration zone 6 where it is contacted with activated sludge and powdered activated carbon. The water in the aeration zone 6 is also contacted with oxygen, preferably in form of air. The water/sludge/activated carbon mixture is passed out of aeration zone 6 through line 7 to second clarification zone 8. Second clarification zone 8 performs a separation between water and suspended solids such as activated sludge and carbon. A preferred clarification zone 8 is a wide well clarifier. Separated sludge and activated carbon from second clarification zone 8 passes through line 22 for recycle to filtration zone effluent through line 24 or for recycle to first clarification zone effluent through line 25 or for recycle to feed waste water through line 26. Powdered activated carbon can be introduced into the system at numerous points. A preferred point of addition is to the aeration zone effluent by addition at point 20 to line 7. A more preferred point of powdered activated carbon addition is at point 21 to second clarification zone effluent at line 9. It is often desirable to pass water from second clarification zone 8 through line 21 to a second filtration zone 10 in order to remove any suspended matter such as suspended carbon or activated sludge. When powdered activated carbon is added at point 21 to clarification zone effluent passing through line 9 to filtration zone 10, the filtration zone 10 will commonly contain large amounts of carbon. This carbon can occasionally be backwashed from filter 10 through line 23 back to recycle points through lines 24, 25, and 26. Water is passed out of filter 10 through line 11. In some cases, it is desirable to purify water to an extremely high level. In those cases effluent from second clarification zone 8 can be passed from line 9 through line 40 or effluent from second filtration zone 10 can be passed from line 11 through line 41 to a final clean up procedure using powdered activated carbon. Water from lines 40 or 41 is contacted with powdered activated carbon which is added at point 42 and then passed on to a reaction zone 43. In this reaction zone, the water is allowed to contact the powdered activated carbon for sufficient time to remove impurities to desired levels. The water and carbon mixture then passes through line 44 to separator 45 which separates powdered activated carbon from water. A preferred separation means is a cyclone type separation zone. An even more preferred configuration houses separation zone 45 within reaction zone 43 so that reaction separator 45 need not have a significant pressure drop across its walls. Purified water is removed from separation zone 45 through line 46. Separated powdered activated carbon is removed from separator 45 through line 47 either for recycle through line 48 to line 40, or for regeneration in regeneration zone 49. Regenerated powdered activated carbon from regeneration zone 49 can be passed through line 50 to line 48 for recycle or can be passed through line 51 for use in the upstream biological system, such as recycling to the aeration zone.

A portion of the powdered activated carbon which is backwashed from filter 4 can be passed through line 28 and 29 to regeneration zone 30 for the regeneration of powdered activated carbon. Where powdered activated carbon is recycled to the feed waste water at line 1 and separated out in first separation zone 2, a portion of this separated powdered activated carbon can be passed through line 27 and 29 for regeneration in regeneration zone 30. Regenerated or reactivated carbon from regeneration zone 30 can be passed out through line 32 for reuse in secondary treatment such as by addition to aeration zone 6.

We claim:

1. An improved process for the purification of waste water comprising:

feeding the waste water to a first clarification zone wherein easily removable solids are separated from the water;

passing the effluent from the first clarification zone to a filtration or air flotation zone wherein the suspended solids and colloidal matter are separated from the water;

passing the effluent from the filtration or air flotation zone to an aeration zone wherein the water is contacted with activated sludge having an average sludge age greater than 10 days and powdered activated carbon, and oxygen or air is introduced into the water-sludge-carbon mixture;

passing the effluent from the aeration zone to a second clarification zone wherein purified water is separated from the sludge and carbon;

recycling a first portion of the separated sludge and carbon from the second clarification zone to the filtration or air flotation zone effluent;

recycling a second part of the separated sludge and carbon from the second clarification zone to the first clarification zone effluent; and passing purified water from the second clarification zone.

2. The process of claim 1 wherein about 0.01 to about 10 weight percent of the total weight sludge and carbon from the second clarification zone is recycled to the first clarification zone effluent and about 99.99 to about 90 weight percent of the total weight sludge and carbon from the second clarification zone is recycled to the filtration or air flotation zone effluent.

3. The process of claim 2 wherein about 0.1 to about 5 weight percent of the total weight of sludge and carbon from the second clarification zone is recycled to the first clarification zone effluent and about 95 to about 99.9 weight percent of the total weight of sludge and carbon from the second clarification zone is recycled to the filtration or air flotation zone effluent.

4. The process of claim 2 wherein a third portion of the separated sludge and carbon from the second clarification zone is recycled to the feed waste water to the first clarification zone.

5. The process of claim 4 wherein about 0.01 to about 10 weight percent of the total weight of separated sludge and carbon from the second clarification zone is recycled to the first clarification zone effluent, about 90 to about 99.9 weight percent of the total weight of separated sludge and carbon from the second clarification zone is recycled to the filtration or air flotation zone effluent, and about 0.01 to about 10 weight percent of the total weight of separated sludge and carbon from the second clarification zone is recycled to the feed waste water to the first clarification zone.

6. The process of claim 4 wherein a portion of the carbon from the first classification zone is passed to a regeneration zone wherein the carbon is at least partially reactivated.

7. The process of claim 6 wherein the reactivated carbon from the regeneration zone is passed to the aeration zone.

8. The process of claim 1 wherein about 1 to about 500 parts of powdered activated carbon per part of water is added to the second clarification zone effluent.

9. The process of claim 8 wherein about 5 to about 40 parts of powdered activated carbon per part of water is added to the second clarification zone effluent.

10. The process of claim 9 wherein the second clarification zone effluent containing carbon is subjected to filtration to remove the carbon and solids.

11. The process of claim 10 wherein the powdered activated carbon is added discontinuously as a slug of carbon.

12. The process of claim 8 wherein the second clarification zone effluent containing carbon is subjected to filtration to remove the carbon and solids.

13. The process of claim 12 wherein the effluent from filtration is contacted with powdered activated carbon in a reaction zone for a time sufficient to reduce contaminants to low levels, purified water is separated from the powdered activated carbon, and a portion of the powdered activated carbon is recycled to the reaction zone.

14. The process of claim 12 wherein the powdered activated carbon is added discontinuously as a slug of carbon.

15. The process of claim 1 wherein about 1 to about 500 parts of powdered activated carbon per part of water is added to the aeration zone effluent.

16. The process of claim 15 wherein about 5 to about 40 parts of powdered activated carbon per part of water is added to the aeration zone effluent.

17. The process of claim 16 wherein the second clarification zone effluent containing carbon is subjected fo filtration to remove the carbon and solids.

18. The process of claim 15 wherein the second clarification zone effluent containing carbon is subjected to filtration to remove the carbon and solids.

19. The process of claim 18 wherein the effluent from filtration is contacted with powdered activated carbon in a reaction zone for a time sufficient to reduce contaminants to low levels, purified water is separated from the powdered activated carbon, and a portion of the powdered activated carbon is recycled to the reaction zone.

20. The process of claim 1 wherein a portion of the carbon from the filtration zone is passed to a regeneration zone wherein the carbon is at least partially reactivated.

21. The process of claim 20 wherein the reactivated carbon from the regeneration zone is passed to the aeration zone.

22. The process of claim 1 wherein the purified water from the second clarification zone is subjected to filtration to remove suspended solids.

* * * * *